United States Patent [19]

Schraut et al.

[11] Patent Number: 4,651,857
[45] Date of Patent: Mar. 24, 1987

[54] CLUTCH DISK UNIT FOR A MOTOR VEHICLE CLUTCH

[75] Inventors: Alfred Schraut; Helmuth Weissenberger, both of Waigolshausen, Fed. Rep. of Germany

[73] Assignee: Fichtel & Sachs Ag, Schweinfurt, Fed. Rep. of Germany

[21] Appl. No.: 735,564

[22] Filed: May 17, 1985

[30] Foreign Application Priority Data

May 19, 1984 [DE] Fed. Rep. of Germany ....... 3418682

[51] Int. Cl.⁴ ................................................. F16D 3/14
[52] U.S. Cl. .............................. 192/70.18; 195/106.1; 195/106.2
[58] Field of Search ............... 192/70.17, 70.18, 106.1, 192/106.2, 107 C; 464/84, 100, 101

[56] References Cited

U.S. PATENT DOCUMENTS

| | | | |
|---|---|---|---|
| 1,734,101 | 11/1929 | Wemp | 192/106.1 |
| 1,830,521 | 11/1931 | Reed | 192/106.1 X |
| 2,042,570 | 6/1936 | Wemp | 192/106.2 |
| 2,314,948 | 3/1943 | Nutt | 192/106.2 |
| 3,428,155 | 2/1969 | Binder et al. | 192/106.1 |
| 3,587,803 | 6/1971 | Sugivra | 192/106.1 X |
| 3,802,541 | 4/1974 | Schneider | 192/106.2 X |
| 4,378,869 | 4/1983 | Friedmann | 192/106.2 |
| 4,398,625 | 8/1983 | Beccaris | 192/106.2 |
| 4,545,468 | 10/1985 | Caray | 192/106.2 |

FOREIGN PATENT DOCUMENTS 2902188 7/1980 Fed. Rep. of Germany .

Primary Examiner—Rodney H. Bonck
Assistant Examiner—Alan G. Towner
Attorney, Agent, or Firm—Toren, McGeady and Goldberg

[57] ABSTRACT

A clutch disk for a motor vehicle clutch comprises a clutch lining carrier with a cover plate facing a first side face of the hub disk. In view of frictional damping of angular movement of the clutch lining carrier with respect to a hub carrying the hub disk a pressure plate is provided axially between the cover plate and the first side face of the hub disk. A friction ring is provided axially between the pressure plate and the side face. Leaf springs are provided axially between the cover plate and the pressure plate. These leaf springs generate an axial pressure between the pressure plate and the side face and connect the pressure plate for common angular movement with the cover plate.

14 Claims, 3 Drawing Figures

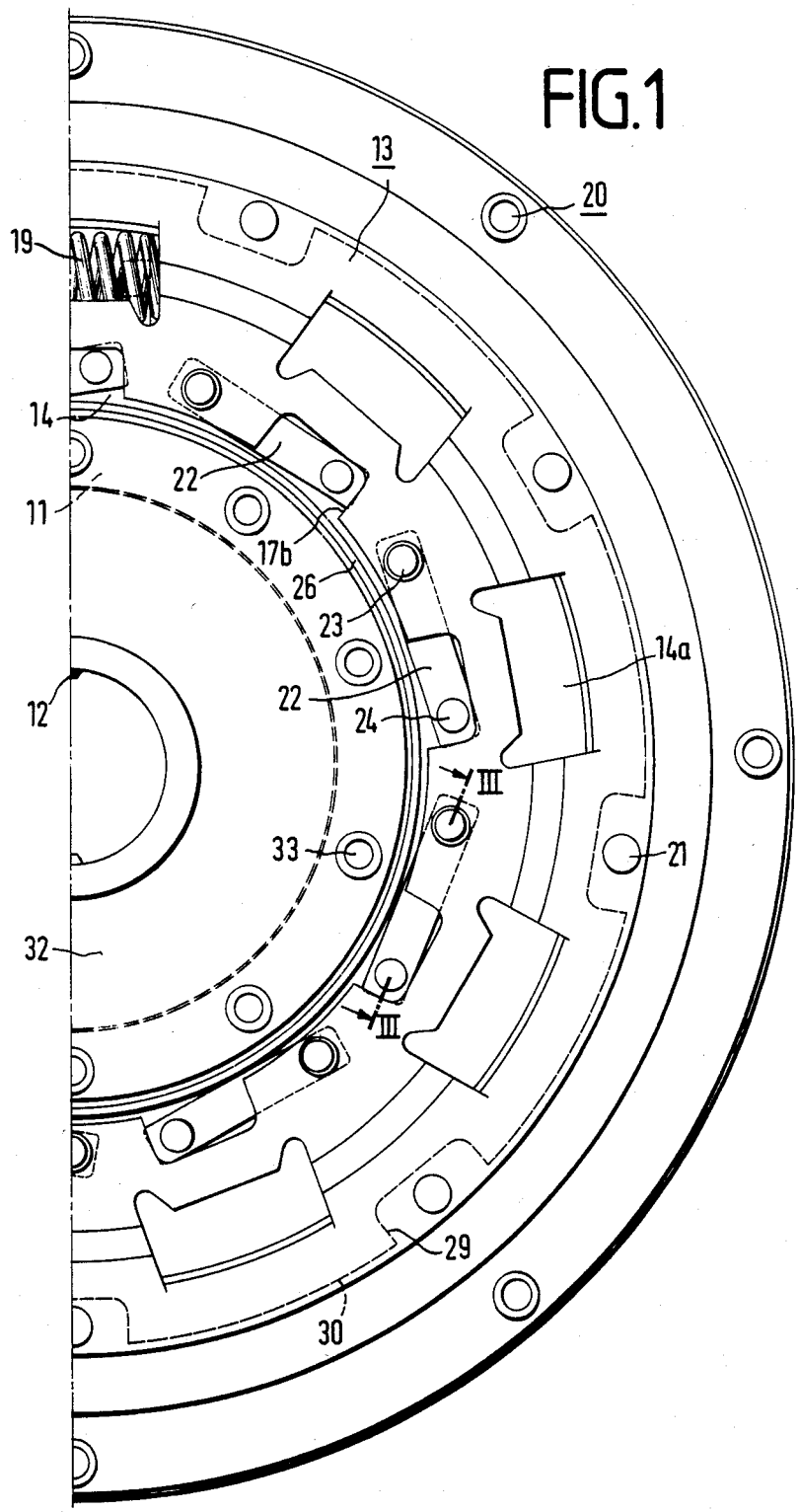

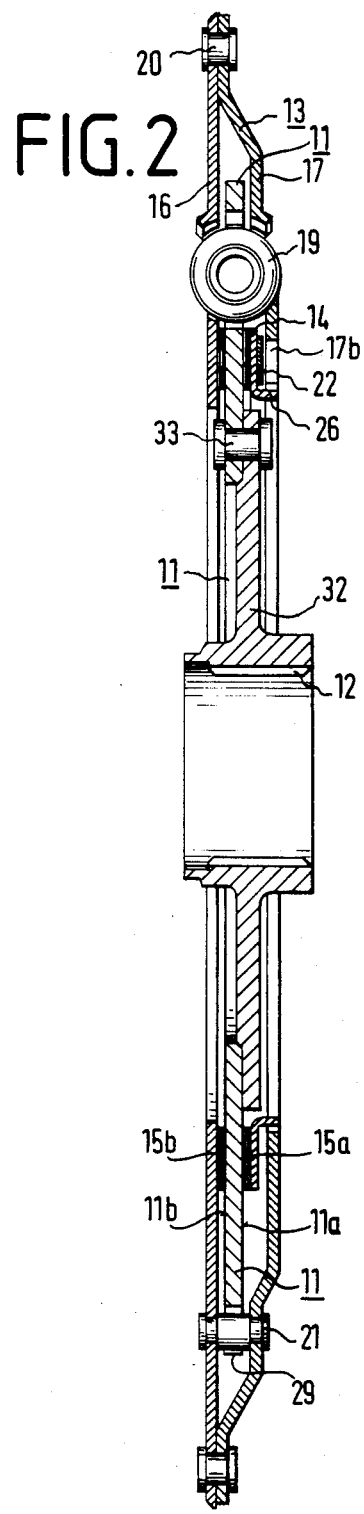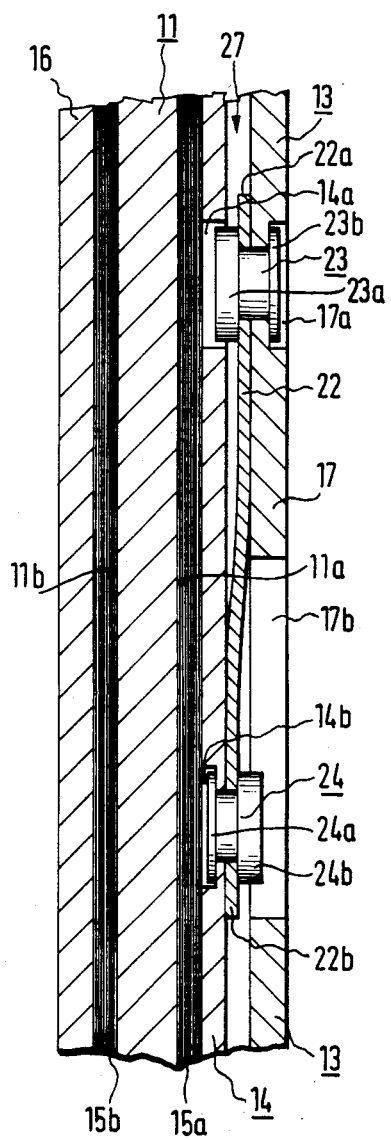

CLUTCH DISK UNIT FOR A MOTOR VEHICLE CLUTCH

BACKGROUND OF THE INVENTION

This invention relates to a clutch disk unit particularly for motor vehicle clutches. In clutch disk units a clutch lining carrier unit is angularly movable with respect to a hub unit against the action of circumferentially acting elastic torque transmitting means. The angular movement is damped by frictional damping means. It is highly desirable that these frictional damping means are effective during the total relative angular movement. Therefore, lost motion of the frictional damping means is to be avoided.

STATEMENT OF THE PRIOR ART

From German 'Offenlegungsschrift' No. 29 02 188 a hub disk unit is known in which the pressure ring is connected for common movement with a cover plate of the clutch lining carrier unit through a pressure generating cup spring which is located axially between the cover plate and the pressure plate. The cup spring is provided at its radially outer circumferential edge with a first group of wedgeshaped lugs which engage into recesses of the cover plate. A second group of wedge-shaped lugs is provided at the radially inner edge of the cup spring and these latter lugs engage into recesses of the pressure plate. In this embodiment, lost motion between the cover plate and the pressure plate is avoided. It was found however that the additional circumferential load on the cup spring is sometimes of disadvantage for the operational behaviour and the lifetime of the clutch disk unit.

OBJECT OF THE INVENTION

It is a primary object of the invention to provide a clutch disk unit in which circumferential lost motion of the frictional damping means is avoided without a circumferentially loaded cup spring.

A further object of the invention is to provide a clutch disk unit of simple and economic construction.

SUMMARY OF THE INVENTION

In view of the above objects a clutch disk unit comprises a hub unit with a hub member having an axis and with a hub disk fixed with respect to the hub member and extending radially outward therefrom. A clutch lining carrier unit is angularly movable with respect to the hub unit about the axis. Circumferentially acting elastic torque transmitting means are provided between the hub unit and the clutch lining carrier unit. Frictional damping means are provided for damping relative angular movement of the hub unit and the clutch lining carrier unit. The clutch lining carrier unit comprises at least one cover plate axially facing a first side face of the hub disk. Distance limiting means are provided for limiting the axial distance of the cover plate from the first side face. A pressure plate is provided axially between the cover plate and the first side face. A friction ring is provided axially between the pressure plate and the first side face. Pressure generating means are provided for axially pressing the pressure plate and the friction ring towards the first side face. Circumferential motion transmitting means are provided between the cover plate and the pressure plate. The motion transmitting means are established by a plurality of leaf springs interconnecting the pressure plate and the cover plate.

According to a preferred embodiment of the invention, the leaf springs act in addition to their function as circumferential motion transmitting means also as pressure generating means. This is highly desirable in view of avoiding additional pressure generating means. A further advantage is that the precompression of the leaf springs generating the axial pressure between the pressure plate and the first side face is relatively unsensitive to the axial distance between the cover plate and the pressure plate and as a result thereof relatively unsensitive to the degree of wear of the friction ring.

The leaf springs can be connected to the pressure plate and/or the cover plate by rivets. The end portions of the rivets can be accomodated within recesses of the pressure plate and the cover plate so as to reduce the space requirements.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWING

The invention will be explained in greater detail below by reference to an example embodiment illustrated in the drawings, wherein FIG. 1 shows a partial end view of a clutch disk unit of this invention;

FIG. 2 shows a sectional view in a plane of section containing the axis of the clutch disk; and FIG. 3 shows as an enlarged detail the interconnection between a pressure plate and a cover plate in a section according to line III—III of FIG. 1.

The clutch disk unit comprises a hub member 12 with a hub flange 32 extending radially outward from said hub member. A hub disk 11 is fastened to the hub flange 32 by a plurality of rivets 33. A clutch lining carrier unit 13 is coaxial with the hub member 12. This clutch lining carrier unit 13 comprises two cover plates 16 and 17 which are interconnected by rivets 20, 21. The cover plate 16 is provided in a radially outer zone with clutch linings (not shown). The clutch lining carrier unit 13 is angularly movable with respect to the hub unit which consists of the hub member 12, the hub flange 32 and the hub disk 11. Circumferentially acting elastic torque transmitting means are provided by helical compression springs 19. These helical compression springs 19 are housed within axially aligned windows of the cover plates 16, 17 and of the hub disk 11. The cover plate 17 faces a first side face 11a of the hub disk 11 and the cover plate 16 faces a second side face 11b of the hub disk 11. Between the first cover plate 17 and the first side face 11a of the hub disk 11 there is provided a pressure plate 14. This pressure plate 14 is provided with an axially directed flange 26 at its radially inner circumference, which flange 26 is located radially inward of the radially inner edge of the cover plate 17. The pressure plate 14 is provided with a first friction ring 15a in frictional contact with the first side face 11a. The friction ring 15a may also be provided on the hub disk 11. A second friction ring 15b is provided on the second cover plate 16 and frictionally engages the second side face 11b of the hub disk 11. This second friction ring 15b may also be provided on the hub disk 11.

The pressure plate 14 is connected to the first cover plate 17 by tangentially extending leaf springs 22. These tangentially extending leaf springs 22 are connected to the cover plate 17 by first rivets 23. The rivets 23 comprise first axial end portions 23a which are housed within recesses or perforations 14a of the pressure plate 14 and second axial end portions 23b which are housed within recesses 17a of the cover plate 17. The connection between the leaf springs 22 and the pressure plate 14 is established by rivets 24. These rivets 24 have first axial end portions 24a which are housed within recesses 14b of the pressure plate 14 and second end portions 24b which are housed within windows 17b of the cover plate 17.

The leaf springs 22 have a non-planar form already before assembling. After assembling, the axial distance 27 between the cover plate 17 and the pressure plate 14 is limited by the cover plate 16, the friction ring 15b and the side face 11b of the hub disk 11. Within this limited distance 27 the leaf springs 22 are pre-compressed so that they are responsive for the pressure under which the pressure plate 14 and the friction ring 15a act against the first side face 11a and also for the pressure under which the cover plate 16 with the second friction ring 15b acts against the second side face 11b. The rivets 23 are provided near end portions 22a of the leaf springs 22 whereas the rivets 24 are provided near end portions 22b of the leaf springs 22. The leaf springs 22 have a substantially rectangular configuration when regarded in FIG. 1.

The pre-compressed leaf springs 22 have a substantially linear spring characteristic; this means that even after partial wear of the friction rings 15a, 15b the pre-compression of the leaf springs 22 is substantially unchanged.

The leaf springs 22 further connect the cover plate 17 and the pressure plate 14 for common angular movement; substantially no lost motion is possible between the pressure plate 14 and the cover plate 17.

The axial flange 26 provides substantial stiffness for the pressure plate 14.

The radially outer edge 30 of the hub disk 11 is provided with recesses 29. These recesses 29 receive rivets 21 interconnecting the cover plates 16 and 17. In the unloaded condition of the clutch disk unit the rivets 21 are in a middle position of the recesses 29, as shown in FIG. 1. Under load the rivets 21 and the recesses 29 define angular movement limiting means which protect the helical compression springs 19 against overload.

It is to be noted that in FIG. 3 the windows 17b extend along about half the length of the leaf springs 22.

It has been found that leaf springs in spite of their plurality are not less economic than a cup spring as used in the prior art.

While a specific embodiment of the invention has been shown and described in detail to illustrate the application of the inventive principles, it will be understood that the invention may be embodied otherwise without departing from such principles.

The reference numerals in the claims are only used for facilitating the understanding and are by no means restrictive.

What is claimed is:

1. A clutch disk unit particularly for motor vehicle clutches comprising:

a hub unit (12, 32, 11) with a hub member (12) having an axis and with a hub disk (11) fixed with respect to said hub member (12) and extending radially outward therefrom;

a clutch lining carrier unit (13) angularly movable with respect to said hub unit (12, 32, 11) about said axis;

circumferentially acting elastic torque transmitting means (19) between said hub unit (12, 32, 11) and said clutch lining carrier unit (13); and frictional damping means (14, 15a, 11a, 22) for damping relative angular movement of said hub unit (12, 32, 11) and said clutch lining carrier unit (13);

said clutch lining carrier unit (13) comprising at least one cover plate (17) axially facing a first side face (11a) of said hub disk (11);

distance limiting means (16, 15b, 11b) being provided for limiting the axial distance of said cover plate (17) from said first side face (11a);

a pressure plate (14) being provided axially between said cover plate (17) and said first side face (11a);

a friction ring (15a) being provided axially between said pressure plate (14) and said first side face (11a);

leaf springs (22) interconnecting said pressure plate (14) and said cover plate (17), said leaf springs (22) being substantially tangential with respect to said axis and transmitting torque about said hub member axis between said cover plate (17) and said pressure plate (14) and being maintained under axial precompression by said distance limiting means (16, 15b, 11b) such as to axially press said pressure plate (14) and said friction ring (15a) towards said first side face (11a), said leaf springs (22) being elongated in the tangential direction relative to said hub member axis, and said leaf springs (22) being connected exclusively to said cover plate (17) and said pressure plate (14).

2. A clutch disk unit as set forth in claim 1, said leaf springs (22) being located in the axial direction of said hub member between said cover plate (17) and said pressure plate (14).

3. A clutch disk unit as set forth in claim 1, said leaf springs (22) having a substantially rectangular elongate shape with a long axis substantially tangential with respect to said axis of said hub member (12) and with end portions spaced along said long axis and fastened to said cover plate (17) and said pressure plate (14), respectively.

4. A clutch disk unit as set forth in claim 1, said leaf springs (22) being fastened to said cover plate (17) by first rivets (23).

5. A clutch disk unit as set forth in claim 1, said leaf springs (22) being fastened to said pressure plate (14) by second rivets (24).

6. A clutch disk unit as set forth in claim 4, said first rivets (23) comprising a first end portion (23a) axially adjacent said hub disk (11), said first end portion (23a) being at least partially received by a recess (14a) in said pressure plate (14).

7. A clutch disk unit as set forth in claim 4, said first rivets (23) having a second end portion (23b) axially remote from said hub disk (11), said second end portion (23b) being at least partially accommodated in a recess (17a) of said cover plate (17).

8. A clutch disk unit as set forth in claim 5, said second rivets (24) having a first end portion (24a) axially adjacent said hub disk (11), said first end portion (24a) being accommodated in a recess (14b) of said pressure plate (14).

9. A clutch disk unit as set forth in claim 5, said second rivets (24) having a second end portion (24b) at least partially accommodated within a window (17b) of said cover plate (17).

10. A clutch disk unit as set forth in claim 1, said leaf springs (22) being non-planar and being shaped with a first part and a second part each extending in the circumferential direction with said first and second parts joined one following the other in the tangential direction by a transition section with said first and second parts disposed in offset planes spaced apart in the said hub member axis direction.

11. A clutch disk unit as set forth in claim 1, said clutch lining carrier unit (13) comprising a second cover plate (16) facing a second side face (11b) of said hub disk (11), a second friction ring (15b) being located axially between said second cover plate (16) and said second side face (11b), said second cover plate (16), said second friction ring (15b) and said second side face (11b) acting as said distance limiting means.

12. A clutch disk unit as set forth in claim 1, said pressure plate (14) being provided with a circumferentially extending flange (26) which is directed axially away from said hub disk (11).

13. A clutch disk unit as set forth in claim 12, said flange (26) being provided at the radially inner circumference of said pressure plate (14).

14. A clutch disk unit as set forth in claim 1, angular movement limiting means (29, 21) being provided on said hub disk (11) and said clutch lining carrier unit (13).

* * * * *